United States Patent
Plouchart et al.

(10) Patent No.: US 10,476,887 B2
(45) Date of Patent: Nov. 12, 2019

(54) CONSUMER AND BUSINESS ANTI-COUNTERFEITING SERVICES USING IDENTIFICATION TAGS

(71) Applicant: INTERNATIONAL BUSINESS MACHINES CORPORATION, Armonk, NY (US)

(72) Inventors: Jean-Olivier Plouchart, New York, NY (US); Wendy Chong, Carmel, NY (US); Alberto Valdes Garcia, Chappaqua, NY (US); Petros Zerfos, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

(21) Appl. No.: 14/976,591

(22) Filed: Dec. 21, 2015

(65) Prior Publication Data

US 2017/0180390 A1    Jun. 22, 2017

(51) Int. Cl.
| | |
|---|---|
| *H04L 29/06* | (2006.01) |
| *H04L 29/08* | (2006.01) |
| *H04W 12/06* | (2009.01) |
| *H04W 12/00* | (2009.01) |

(52) U.S. Cl.
CPC ............ *H04L 63/123* (2013.01); *H04L 63/08* (2013.01); *H04L 67/1031* (2013.01); *H04W 12/06* (2013.01); *H04W 12/00522* (2019.01)

(58) Field of Classification Search
CPC ................................................... H04L 63/123

USPC ............................................................. 726/6
See application file for complete search history.

(56) References Cited

U.S. PATENT DOCUMENTS

| | | | |
|---|---|---|---|
| 7,427,030 B2 | 9/2008 | Jones et al. | |
| 8,112,626 B1 * | 2/2012 | Adler | H04L 9/3271 |
| | | | 380/46 |
| 8,503,718 B2 | 8/2013 | Muriello et al. | |
| 8,683,210 B2 * | 3/2014 | Devadas | H04L 9/3278 |
| | | | 380/44 |

(Continued)

FOREIGN PATENT DOCUMENTS

| | | |
|---|---|---|
| AU | 2012101699 B4 * | 1/2013 |
| CN | 1655161 A | 8/2005 |
| CN | 103310254 A | 9/2013 |

OTHER PUBLICATIONS

Tuyls, Pim, and Boris Škoric. "Strong authentication with physical unclonable functions." Security, Privacy, and Trust in Modern Data Management. Springer Berlin Heidelberg, Oct. 2006. 133-148.

(Continued)

*Primary Examiner* — Khalil Naghdali
(74) *Attorney, Agent, or Firm* — Tutunjian & Bitetto, P.C.; Grant Johnson

(57) ABSTRACT

Methods and systems for tag-based identification include reading a counterfeit-proof identification tag using a sensor in a user device. Features of the identification tag are extracted in accordance with a feature extraction function, using a processor, to generate a tag bit sequence. A challenge function is applied to the extracted features to generate a result. The result is transmitted to a remote server to authenticate the identification tag.

18 Claims, 7 Drawing Sheets

(56) References Cited

U.S. PATENT DOCUMENTS

| | | | |
|---|---|---|---|
| 8,941,469 B1* | 1/2015 | Diorio | H04L 9/3247 340/10.1 |
| 9,582,714 B2* | 2/2017 | Ross | G06K 9/3216 |
| 9,697,298 B2* | 7/2017 | Rosati | G06F 17/30887 |
| 9,792,472 B1* | 10/2017 | Robshaw | G06K 7/10257 |
| 10,148,435 B2 | 12/2018 | Young et al. | |
| 2007/0194889 A1* | 8/2007 | Bailey | H04L 9/321 340/10.51 |
| 2009/0106042 A1* | 4/2009 | Maytal | G06Q 30/018 705/317 |
| 2010/0115591 A1 | 5/2010 | Kane-Esrig | |
| 2010/0162072 A1* | 6/2010 | Chabanne | G07C 9/00158 714/752 |
| 2011/0234829 A1 | 9/2011 | Gagvani et al. | |
| 2011/0248827 A1* | 10/2011 | Bertoncini | H04W 12/06 340/10.1 |
| 2012/0274596 A1* | 11/2012 | Ludwig | G06F 3/0412 345/173 |
| 2014/0009612 A1 | 1/2014 | King | |
| 2014/0079932 A1 | 3/2014 | Aksay et al. | |
| 2014/0152507 A1* | 6/2014 | McAllister | G06K 7/10376 342/126 |
| 2014/0162464 A1 | 6/2014 | Dimitrakopoulos et al. | |
| 2016/0207345 A1* | 7/2016 | Farmer | B42D 25/36 |
| 2017/0091782 A1* | 3/2017 | Nawrocki | G06Q 30/0185 |
| 2018/0018846 A1 | 1/2018 | Falko et al. | |
| 2019/0074963 A1 | 3/2019 | Young et al. | |

OTHER PUBLICATIONS

Beekhof, Fokko, et al. "Secure surface identification codes." Electronic Imaging. International Society for Optics and Photonics, Mar. 18, 2008.

Babu, Harsha Umesh, W. Stork, and H. Rauhe. "Anti-counterfeiting using reflective micro structures-Based on random positioning of microstructures." in Advances in Optoelectronics and Micro/Nano-Optics (AOM), 2010 OSA-IEEE-COS, vol., no., pp., Dec. 3-6, 2010.

* cited by examiner

US 10,476,887 B2

CONSUMER AND BUSINESS ANTI-COUNTERFEITING SERVICES USING IDENTIFICATION TAGS

BACKGROUND

Technical Field

The present invention relates to identification tagging and, more particularly, to unique identification tags that cannot be counterfeited.

Description of the Related Art

Identification tags are used to mark goods so that, for example, a retailer can rapidly scan the product for sale. Other uses include inventory management and security, where unique identification of an individual object or person is needed. Existing identification tags include barcodes and radio-frequency identification (RFID), each of which has different challenges.

In the case of barcodes, the information is readily copied, making them easy targets for counterfeiting. In addition, barcodes are frequently applied to goods in the form of stickers, making them easy to tamper with and remove, or move to another product entirely.

In the case of RFID, there is no unifying standard between implementations in different countries and a proprietary reader is needed. In addition, RFID suffers from poor customer acceptance, because they can be read remotely and may therefore cause security concerns. In addition, most RFIDs are passive and can be disabled by enclosing them inside a Faraday cage. For example, it has been reported that shoplifters can pass through a security check simply by carrying the goods in a bag having a metal foil lining.

SUMMARY

A method for tag-based identification includes reading a counterfeit-proof identification tag using a sensor in a user device. Features of the identification tag are extracted in accordance with a feature extraction function, using a processor, to generate a tag bit sequence. A challenge function is applied to the extracted features to generate a result. The result is transmitted to a remote server to authenticate the identification tag.

A method for tag-based identification includes transferring a challenge function from a server to a user device. A challenge result is received from the user device that comprises a bit sequence, extracted from a counterfeit-proof identification tag, that has been irreversibly manipulated by the challenge function. The challenge result is compared to a tag database at the server to authenticate the identification tag using a processor.

A system for tag-based identification includes a sensor configured to read a counterfeit-proof identification tag. A feature extraction module includes a processor configured to extract features of the identification tag in accordance with a feature extraction function to generate a tag bit sequence. A challenge module is configured to apply a challenge function to the extracted features to generate a result. A network interface is configured to transmit the result to a remote server to authenticate the identification tag.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
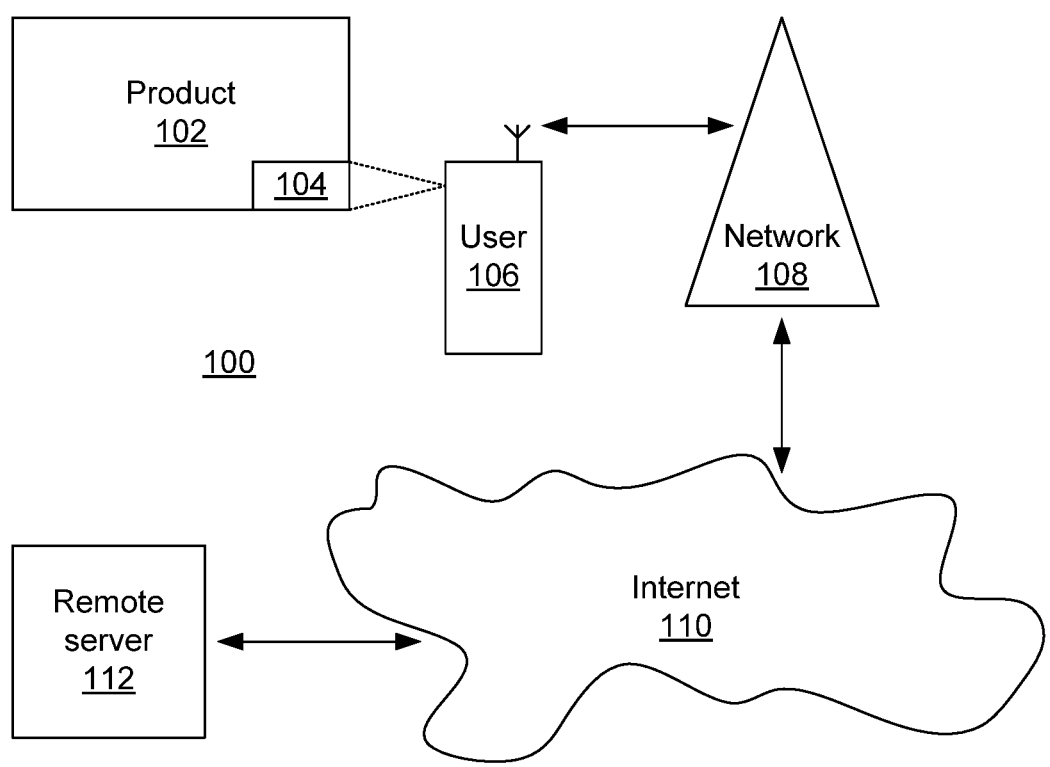
FIG. 1 is a diagram of a tag-based authentication system in accordance with the present principles.

Embodiments of the present invention provide unique fingerprinting for identification using manufacturing randomness in conjunction with high-resolution imaging. The resulting identification tags are unique and cannot be easily copied. Furthermore, the tags may be read using conventional consumer devices due to improvements in the optical capabilities of such devices. The user device captures a customized image of the tag and processes the image with a unique function provided by, for example, the manufacturer or other controlling body, specifying the characteristics of the image capturing process.

The weakness of existing identification technologies exposes retailers and consumers to the risk of counterfeiting and theft, with consumers being exposed to counterfeit products (which may easily be defective and, therefore, damaging to the brand). In addition, gray market resale of stolen or counterfeit goods makes consumers potentially liable in countries that criminalize purchase of such goods. The present embodiments address these difficulties by providing counterfeit-proof identification tags.

Customization of the image capturing process can involve specifying an area of the image that is of interest, defining a level of zoom, resolution, and color processing, feature extractions, etc., and can be readily provided by modern mobile devices, such as smartphones, that have sophisticated image processing capabilities. The mobile device creates a unique view of the tag, since each device can be instructed to focus on a particular part of the image. This approach obviates the need for specialized reader devices, such as those used by RFID, making it accessible to consumers' existing equipment.

The one or more embodiments of the present invention contemplate multiple types of unclonable identification tags. In a first case, optical tags may be used that provide a high degree of randomness in their fabrication. In one example, a visible tag can be created from, for example, graphene. Even if a counterfeiter attempted to scan and reprint such a tag, there would still be visible differences due to the inherent differences in optical properties between graphene, paper, and ink. Some graphene fabrication processes, for example chemical vapor deposition (CVD), can generate a truly random image, such that each tag is different from every other tag. As a result, the tag creation process guarantees tag uniqueness, even if the precise graphene fabrication process is copied.

In a second case, electrical tags may be used that include a physical unclonable function to guarantee that, if the manufacturing process is copied, a different tag will nonetheless be fabricated. A physically unclonable function may, for example, be based on the electrical properties (e.g., threshold voltage, resistance, capacitance) of a device that are subject to manufacturing variability. One or more bits are generated from one such value, and a physically unclonable function may use several such elements to generate a randomized, repeatable, and unique value that identifies the device. Other protection mechanisms can be used to prevent copying and spoofing the tag. An electrical tag may be read via, for example, a wireless link such as BLUETOOTH®. In the case of an electrical tag, instead of a physical unclonable function, a unique sequence of bits may be stored in, for example, a write-once memory of the tag 104. This stored sequence of bits is less secure than a physical unclonable function, but may be easier to create and provision. To inhibit counterfeiting, the stored bit sequence should be encoded and stored in such a way as to make it difficult for a would-be counterfeiter to extract and replicate.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Referring now to FIG. 1, a tag authentication system 100 is shown. A product 102 is shown having an identification tag 104. It should be understood that the tag 104 may be affixed in any appropriate manner or embedded in the product 102 and, in the case of an electrical tag, may not even be visible. In one specific embodiment, however, it is contemplated that the tag 104 is a visible tag, for example including graphene or some other material that has a difficult to reproduce fabrication process, that has a unique shape and visual appearance. A user makes use of a mobile device 106 to take a picture of the tag 104 or otherwise measure its unique properties.

The mobile device 106 is in communication with a remote server 112 via a mobile network 108 (e.g., a local WIFI® connection, a cellular connection, or a wired network connection) and the internet 110. It is contemplated that the remote server 112 may be a single, centralized server or may, instead, be implemented using one or more cloud computing solutions. The mobile device 106 analyzes the image of the tag 104 and combines it with a challenge provided by the remote server 112. The mobile device 106 can register a new product 102 (for example, if a user buys the product and registers it with the manufacturer). The mobile device 106 can furthermore create entries at the remote server 112 for a new tag 104 and can determine whether such an entry already exists.

Figure 2:
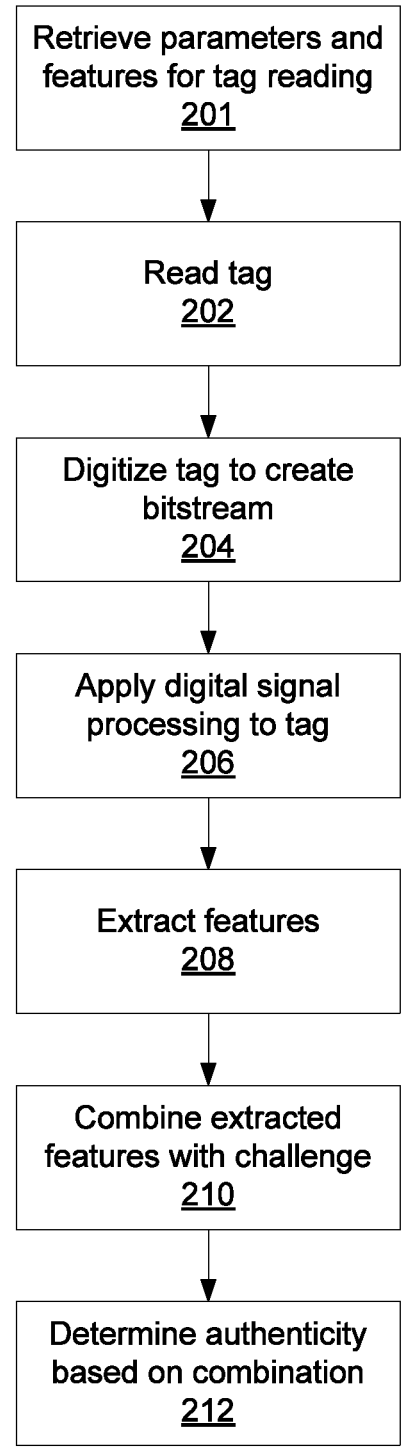
FIG. 2 is a block/flow diagram of a method for tag-based authentication in accordance with the present principles.

Referring now to FIG. 2, a method for tag-based authentication is shown with the aid of FIG. 1. In block 201, the mobile device 106 retrieves a set of parameters from the remote server 112 that are used to collect information about tags 104. These parameters may include, for example, digital signal processing parameters that govern, e.g., resolution, zoom level, area to be photographed, etc. Block 201 also retrieves feature extraction information from the remote server 112 that determines how the mobile device 106 extracts features from the tag 104. Block 202 reads the tag 104 using the mobile device 106 in accordance with the parameters. The tag 104 may be an optical tag, such as a graphene image, an image created with any randomized semi-transparent material, or may alternatively be an electrical tag.

Block 204 digitizes the tag to create a bitstream if an optical tag is used. In the case of an electrical tag, the digitized bitstream generally forms the tag's identification information, but it should be understood that an analog electrical tag may be used and would therefore be digitized by block 204. Block 204 is therefore implemented either in the mobile device 106 or the tag itself 104. This digitization can be performed at different resolutions and non-linearities, leading to different bitstreams from the same tag depending on the parameters used. The digitization parameters may be generated randomly by the mobile device 106 or may be set by the remote server 112. Block 206 then applies digital signal processing to the tag bitstream and may include, for example, cropping, definition of a sampling grid, thresholding, filtering, etc.

Block 208 then extracts features of the tag 104 from the processed tag bitstream. These features may include, for example, contours, intersections, vacuities, etc. In one embodiment, the digital signal processing function and feature extraction function are shared across all mobile devices 106. This provides quick authentication, since only the features need to be extracted and compared. In another embodiment, digital signal processing and feature extraction are unique for each mobile device 106, thus allowing a unique association between mobile device 106 and product 102. In this case, the tag bit sequence may be used to generate the unique feature bit sequence corresponding to the unique digital signal processing and feature extraction. User identification information is then unneeded to establish ownership of the product 102.

Block 210 combines the extracted features with a challenge from the central server 112. This challenge is used to prevent a third party from accessing the original identification tag bit stream by listening to the communication between the mobile device 106 and the remote server 112 and may be sent only to a mobile device 106 that has been registered with the remote server 112. Block 210 applies the challenge as a function on the extracted features to produce a result, with the challenge being selected such that it is easy to compute directly, but is difficult to invert, making it difficult for a would-be counterfeiter to recover the tag 104 from the result. Block 212 then transfers the result to the remote server 112 and is used to authenticate the tag 104. If the remote server 112 finds a match for the result in its database, then the tag 104 is authenticated. Authentication may address the tag 104 alone or may address the combination of the tag 104 and the mobile device 106, as the mobile device 106 may employ parameters in capturing the tag 104 that are unique to it.

As used herein, the term "challenge function" refers to a function that manipulates a bit sequence. In one embodiment, the tag bit sequence itself is never sent over a network where it might be intercepted. Instead, the tag bit sequence is modified by the challenge function. One exemplary way to modify the tag bit sequence is to use a bit swap function controlled by the challenge bit sequence. More complex functions (e.g., a cryptographic hash function such as MD5, SHA-1, SHA-2, or SHA-3) can be used instead, such that the modified bit sequence is easy to calculate but difficult to reverse. In this way, even if an attacker or counterfeiter listens to all of the information exchanged by the remote server 112 and the user device 106, the attacker will not be able to discover or replicate the tag bit sequence. In an alternative embodiment, the challenge function may be a function that encrypts (rather than merely hashes) the tag bit sequence.

Based on this authentication, the controlling body may make any of a variety of actions. For example, the product 102 may be registered to the specific mobile device 106, creating an association between the two. The product 102 may be "activated," using the successful authentication to either change the state of the product 102 itself or to change a state of the product 102 as reflected in a database at the remote server 112.

Figure 3:
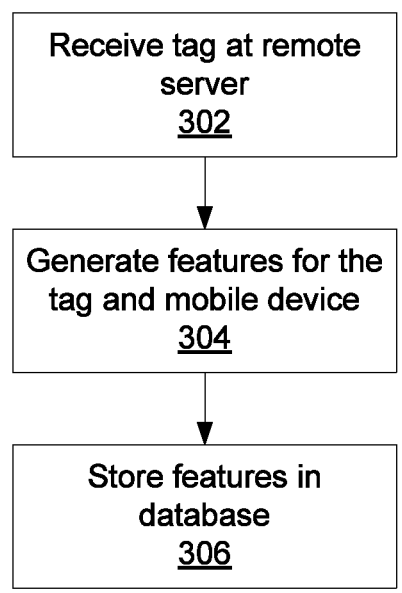
FIG. 3 is a block/flow diagram of a method for registering an identification tag in accordance with the present principles.

Referring now to FIG. 3, a method of registering a new tag 104 is shown. In block 302, the remote server 112 receives the tag information. The tag information may be a high-resolution image of the tag 104, in the case of an optical tag, or may alternatively be a bitstream from the physically unclonable function that makes up an electrical tag. Block 304 generates features for the tag 104 and an associated mobile device 106, which block 306 then stores in a database at the remote server 112 along with the tag bit sequence. In this way, the remote server 112 can perform the same operations that are performed by the mobile device 106 to verify that a received challenge response is correct.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
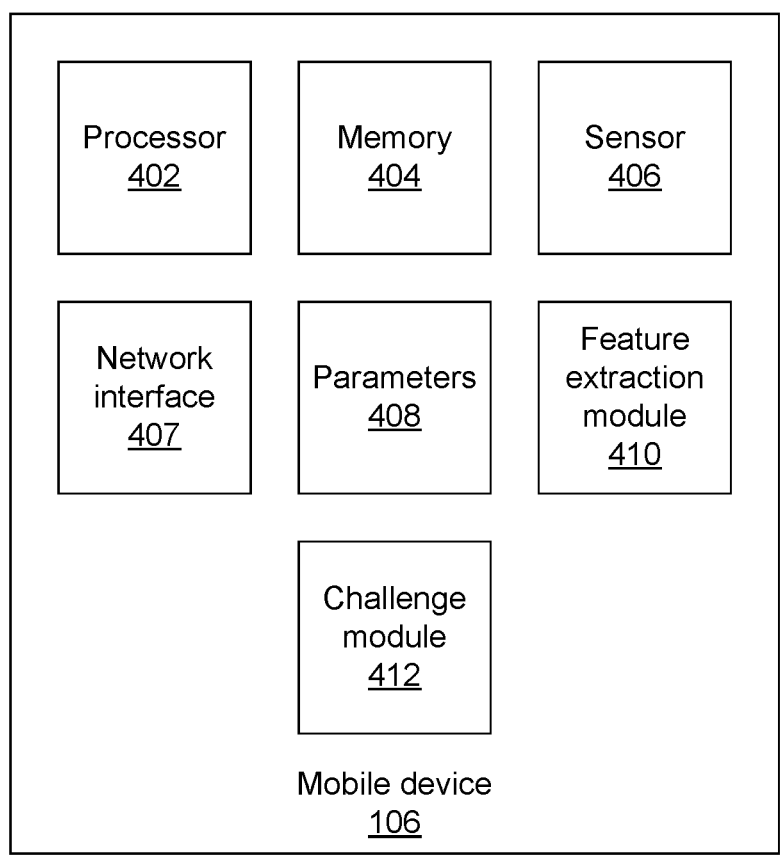
FIG. 4 is a block diagram of a mobile device for reading an identification tag in accordance with the present principles.

Referring now to FIG. 4, detail on a mobile device 106 is shown. It should be recognized that the functions of the general-purpose mobile device 106 may be performed by other types of device including, but not limited to, a fixed device or a single-purpose device. The device 106 includes a hardware processor 402 and memory 404. The device uses a sensor 406 (e.g., imaging device within the device camera) to collect information about a tag 104 and store that information in memory 404. In addition, a network interface 407 allows communication with the remote server 112. One or more tag collection parameters 408 are further stored in the memory 404, setting how the sensor 406 collects and processes information about the tag.

In addition, the mobile device 106 includes certain functional modules. These modules may be executed as software on the hardware processor 402 or may, alternatively, be implemented as one or more discrete hardware components in the form of, e.g., an application specific integrated chip or a field programmable gate array. A feature extraction module 410 performs a function on the stored tag information to extract one or more characteristic features of the tag 104. The specific feature extraction function may be hard-coded or may, alternatively, be supplied by the remote server 112. The challenge module 412 receives a challenge function from the remote server 112 and applies it to the features of the tag 104, creating a result that is communicated back to the remote server 112.

The mobile device 106 thereby accepts certain information from the remote server, in one embodiment including the parameters 408, the feature extraction function used by the feature extraction module 410, and the challenge used by the challenge module 412. It is particularly contemplated that the parameters 408 and the feature extraction function may be unique to the mobile device 106, essentially creating a unique identifying function of the mobile device 106. Thus, even if the same tag 104 were read by two different mobile devices 106, the remote server 112 would be able to distinguish between different tag-device pairs.

Figure 5:
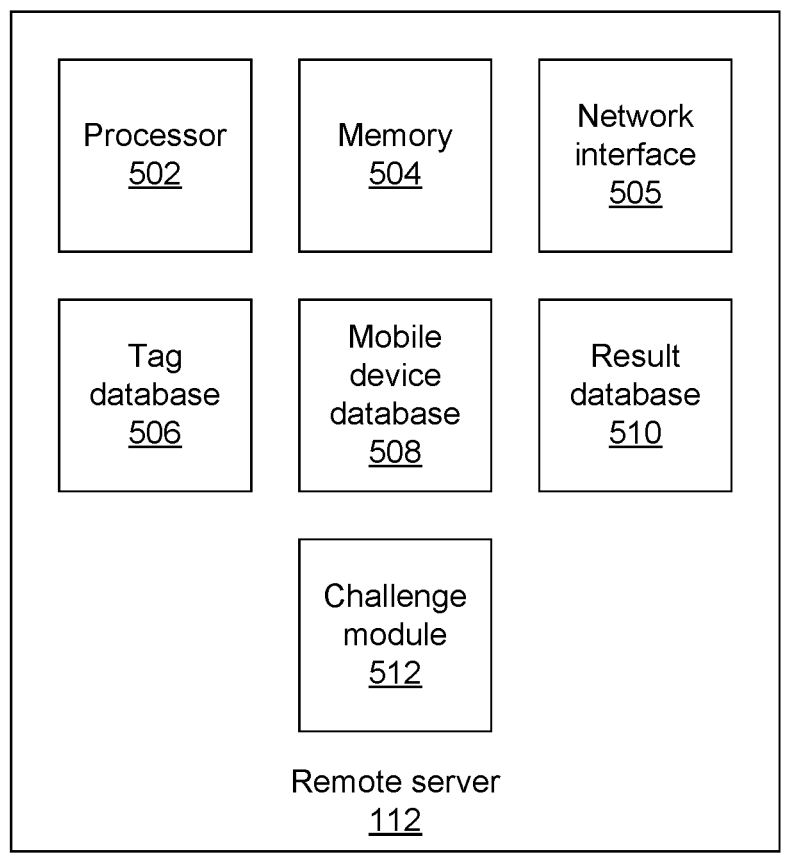
FIG. 5 is a block diagram of an authentication server for authenticating an identification tag in accordance with the present principles.

Referring now to FIG. 5, additional detail on the remote server 112 is shown. Although in this embodiment the remote server 112 is described herein as being a single device, it should be recognized that the remote server 112 may instead be implemented as multiple devices or in a cloud, as described below. The remote server 112 includes hardware processor 502 and memory 504. In addition, a network interface 505 allows communication with the mobile device 106.

The remote server 112 stores a set of databases in its memory 504. In particular, the remote server 112 stores a tag database 506, which includes raw tag information for a set of tags 104. This raw tag information may include an image of an optical tag or a bitstream corresponding to an unclonable physical function or stored identifier of an electrical tag. A mobile device database 508 keeps a list of registered mobile devices 106 with corresponding parameters and feature extraction functions. A result database 510 maintains a collection of results from challenges sent to mobile devices 106 that identify tag-device pairs.

In addition, the mobile device 106 includes certain functional modules. These modules may be executed as software on the hardware processor 502 or may, alternatively, be implemented as one or more discrete hardware components in the form of, e.g., an application specific integrated chip or a field programmable gate array. In particular, a challenge module 512 communicates with the mobile device 106, sending a challenge function. The mobile device 106 provides a response that the challenge module 512 then uses to compare against the result database 510 and determine whether the tag/device combination in question is authenticated.

Figure 6:
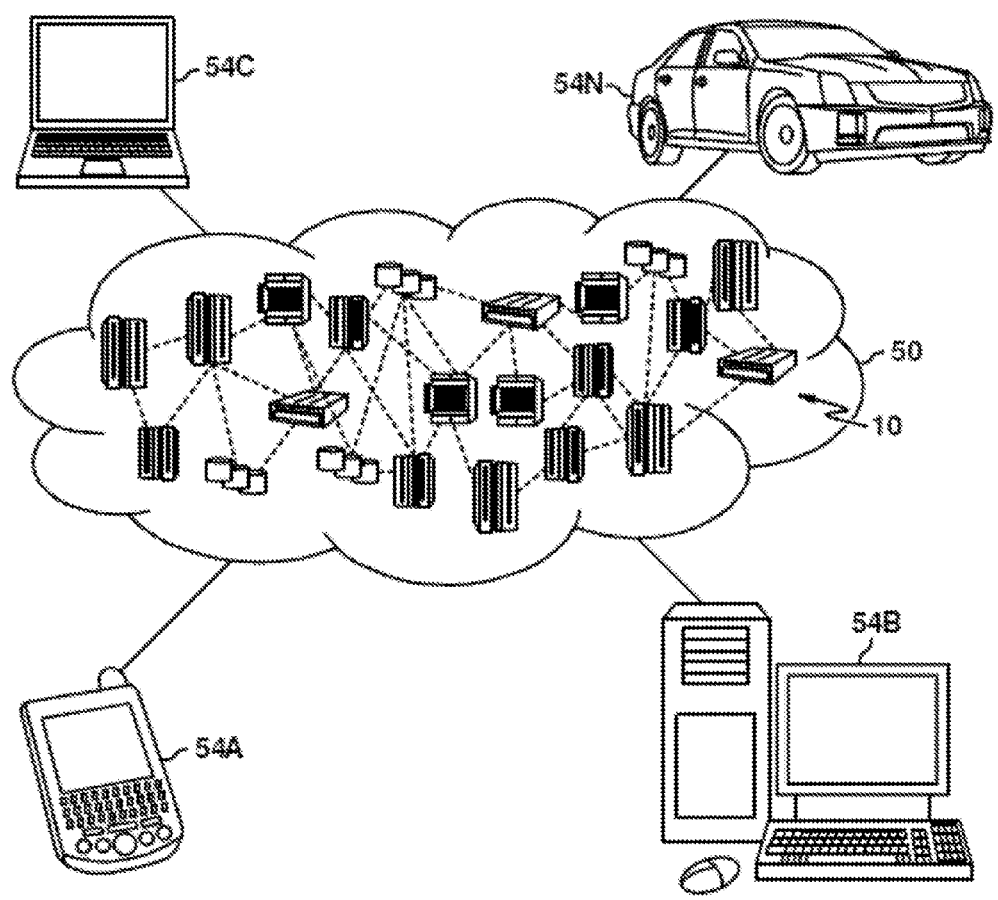
FIG. 6 is a diagram of a cloud computing environment according to the present principles.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
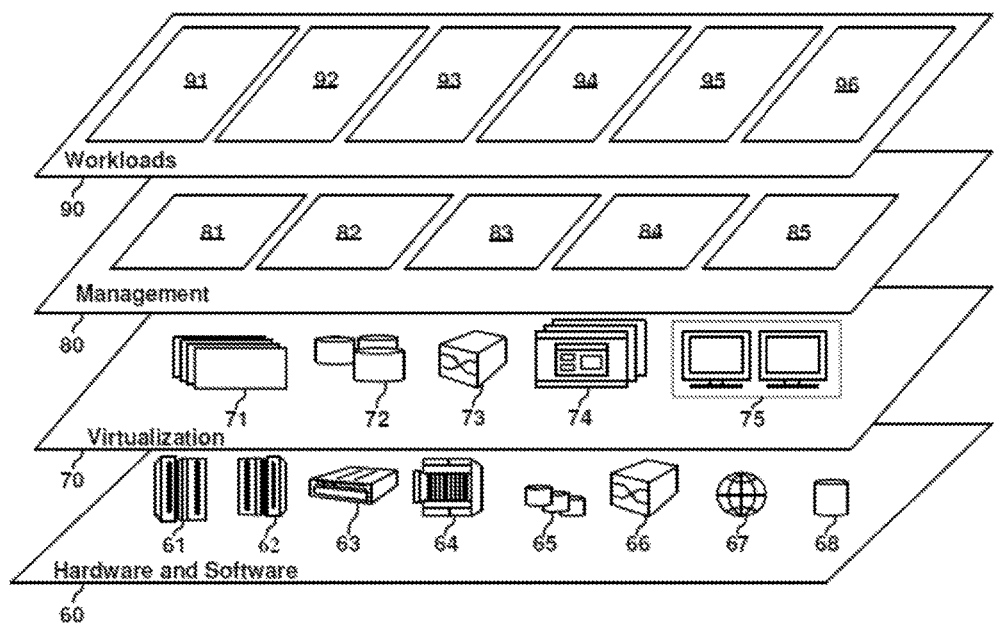
FIG. 7 is a diagram of abstraction model layers according to the present principles.

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tag authentication processing 96 (e.g., processes corresponding to FIGS. 2 and 3).

Having described preferred embodiments of consumer and business anti-counterfeiting services using identification tags (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for tag-based identification, comprising:
   receiving a challenge bit sequence and a set of parameters at a user device from a remote server;
   reading a counterfeit-proof identification tag using a sensor in the user device using the set of parameters;
   extracting features of the counterfeit-proof identification tag in accordance with a feature extraction function, using a processor, to generate a tag bit sequence;
   applying a challenge function to the extracted features and the challenge bit sequence to generate a result; and
   transmitting the result to a remote server to authenticate the counterfeit-proof identification tag; and
   authenticating the counterfeit-proof identification tag with a tag database at the remote server.

2. The method of claim 1, wherein the counterfeit-proof identification tag comprises an image formed from a semi-transparent material and wherein reading the counterfeit-proof identification tag comprises taking a picture of the semi-transparent material.

3. The method of claim 2, wherein the semi-transparent material is graphene.

4. The method of claim 1, wherein the counterfeit-proof identification tag comprises a physically unclonable electrical function and wherein reading the counterfeit-proof identification tag comprises acquiring a set of bits from the counterfeit-proof identification tag.

5. The method of claim 1, further comprising receiving the feature extraction function at the user device from the remote server.

6. The method of claim 1, wherein applying the challenge function comprises irreversibly manipulating the tag bit sequence.

7. A method for tag-based identification, comprising:
   transferring a challenge function and a set of parameters from a server to a user device, the challenge function including a challenge bit sequence;
   receiving a challenge result from the user device that comprises a response bit sequence, extracted from a counterfeit-proof identification tag using the set of parameters, that has been irreversibly manipulated by the challenge function using the challenge bit sequence; and
   comparing the challenge result to a tag database at the server to authenticate the counterfeit-proof identification tag using a processor and a tag database.

8. The method of claim 7, wherein the counterfeit-proof identification tag comprises a graphene image and wherein the bit sequence extracted from the counterfeit-proof identification tag comprises a picture of the counterfeit-proof identification tag.

9. The method of claim 7, wherein the counterfeit-proof identification tag comprises a physically unclonable electrical function and wherein the bit sequence extracted from the counterfeit-proof identification tag comprise a set of bits stored by the physically unclonable function.

10. The method of claim 7, further comprising transmitting a set of parameters from the server to the user device, wherein the response bit sequence is extracted from the counterfeit-proof identification tag in accordance with the parameters.

11. A system for tag-based identification, comprising:
   a sensor configured to read a counterfeit-proof identification tag using a set of parameters that are received from a remote server;
   a feature extraction module, comprising a processor that is configured to extract features of the counterfeit-proof identification tag in accordance with a feature extraction function to generate a tag bit sequence;
a challenge module configured to apply a challenge function to the extracted features and a challenge bit sequence to generate a result;
a network interface configured to receive the challenge bit sequence from a remote server, and to transmit the result to the remote server to authenticate the counterfeit-proof identification tag, and to trigger authentication of the counterfeit-proof identification tag with a tag database at the remote server.

12. The system of claim 11, wherein the counterfeit-proof identification tag comprises a graphene image and wherein the sensor is a camera configured to take a picture of the counterfeit-proof identification tag.

13. The system of claim 11, wherein the counterfeit-proof identification tag comprises a physically unclonable electrical function and wherein the sensor is configured to acquire a set of bits from the counterfeit-proof identification tag.

14. The system of claim 11, wherein the network interface is further configured to receive the feature extraction function at the user device from the remote server.

15. The method of claim 1, wherein the challenge function is selected from the group consisting of a cryptographic hash function, a bit swap controlled by the challenge bit sequence, and an encryption function.

16. The method of claim 2, further comprising receiving feature extraction information from the remote server, wherein taking a picture of the semi-transparent material comprises taking the picture in accordance with the feature extraction information.

17. The method of claim 16, wherein the feature extraction information include information selected from the group consisting of an area of interest, a level of zoom, a level of resolution, and a level of color processing.

18. A method for tag-based identification, comprising:
receiving a set of parameters at a user device from a remote server;
taking a picture of a graphene counterfeit-proof identification tag using a camera in the user device using the set of parameters;
extracting features of the picture of the counterfeit-proof identification tag in accordance with a feature extraction function, using a processor, to generate a tag bit sequence;
applying a challenge function to the extracted features to generate a result;
transmitting the result to a remote server; and
authenticating the counterfeit-proof identification tag with a tag database at the remote server.

* * * * *